(12) United States Patent
Guedalia

(10) Patent No.: US 6,356,283 B1
(45) Date of Patent: *Mar. 12, 2002

(54) METHOD AND SYSTEM FOR HTML-DRIVEN INTERACTIVE IMAGE CLIENT

(75) Inventor: Joshua Siegfried Guedalia, Jerusalem (IL)

(73) Assignee: MGI Software Corporation, Richmond Hill (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/095,459

(22) Filed: Jun. 10, 1998

Related U.S. Application Data

(63) Continuation-in-part of application No. 08/979,220, filed on Nov. 26, 1997.

(51) Int. Cl.[7] .................................................. G06F 3/14
(52) U.S. Cl. ........................ 345/760; 345/856; 345/805; 345/781
(58) Field of Search ................................ 345/357, 335, 345/329, 356, 340, 342, 346; 707/507, 513, 514, 517, 515, 520

(56) References Cited

U.S. PATENT DOCUMENTS

| | | |
|---|---|---|
| 5,649,186 A | 7/1997 | Ferguson |
| 5,682,441 A | 10/1997 | Ligtenberg et al. ......... 382/232 |
| 5,721,851 A | 2/1998 | Cline et al. |
| 5,742,768 A | 4/1998 | Gennaro et al. |
| 5,760,783 A | 6/1998 | Migdal et al. ............... 345/430 |
| 5,793,964 A | 8/1998 | Rogers et al. |
| 5,802,530 A | 9/1998 | Van Hoff |
| 5,826,242 A | 10/1998 | Montulli |
| 5,884,014 A | 3/1999 | Huttenlocher et al. |
| 6,121,966 A * | 9/2000 | Teodosio et al. ........... 345/346 |

OTHER PUBLICATIONS

IEEE Computer Society Press, "Fourteenth IEEE Symposium on Mass Storage Systems Storage–At the Forefront of Information Infrastructures", Monterey, CA, Sep. 11–14, 1995, pp 146–161.

Thomas Stephenson, "Network Large Image Archives: The Storage & Management Issues", Advanced Imaging, vol. 8, No. 1, Jan. 1993 pp. 4,14,16,& 18.

N.Dal Degan, et al., "Still images retrieval from a remote database: The system Imagine", Signal Processing: Image Communication 5 (1993) pp. 219–234.

(List continued on next page.)

Primary Examiner—Raymond J. Bayerl
Assistant Examiner—Thomas T. Nguyen
(74) Attorney, Agent, or Firm—Blakely, Sokoloff, Taylor & Zafman

(57) ABSTRACT

A method and system for archiving digital data on a server computer, and enabling a user, by means of a client computer, to interactively view a digital image derived from the digital data, the method including receiving an original HTML page by the client computer from the server computer, the original HTML page containing a view window within which a first image is displayed, the view window being partitioned into a plurality of sub-regions at least one of which contains a multiplicity of pixels, selecting a location within the view window corresponding to one of the plurality of sub-regions by the user, initial sending by the client computer to the server computer an indication of the sub-region selected by the user, creating by the server computer a new HTML page containing a link to an embedded image which corresponds to the indication, and further sending the new HTML page by the server computer to the client computer.

46 Claims, 7 Drawing Sheets

OTHER PUBLICATIONS

Lance Williams, "Pyramidal Parametrics", Computer Graphics Siggraph '83 Conference Proceedings, vol. 17, No. 3, Jul. 1983, 11 pgs.

Helen C. Marz, et al., "Cameras, Scanners, and Image Acquisition Systems", Society of Photo–Optical Instrumentation Engineers, vol. 1901, 3–4 Fe. 1993, pp. 25–36.

John R. Smith, et al., "Quad–Tree Segmentation for Texture–Based Image Query", Proceedings of the $2^{nd}$ Annual ACM Multimedia Conference, San Francisco, CA, Oct. 1994, 12 pgs.

Shiu–Fu Chang, et al., "Development of Advanced Image/Video Servers in a Video on Demand Testbed", IEEE Visual Signal Processing and Communications Workshop, New Brunswick, NJ, Sep. 1994, pp. 1–6.

"Illustrated Guide to HTTP", by Paul S. Hethmon, 1997, Manning Publications Co., Greenwich CT, 1997.

"Internet Imaging Protocol", 1997, Hewlett Packard Company, Live Picture, Inc., and Eastman Kodak Company.

"FlashPix Format Specification", 1996, 1997, Eastman Kodak Company.

\* cited by examiner

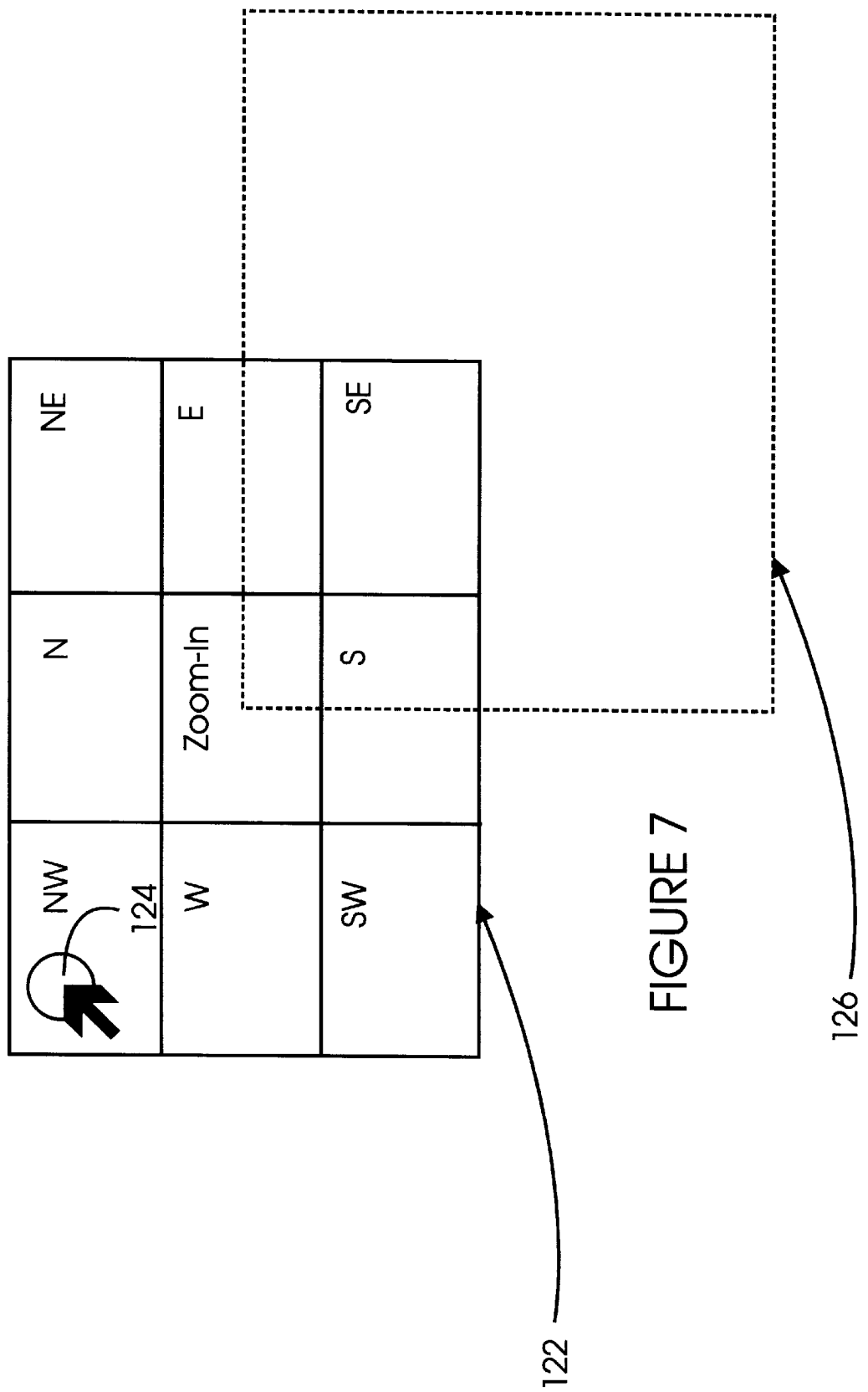

METHOD AND SYSTEM FOR HTML-DRIVEN INTERACTIVE IMAGE CLIENT

The present invention relates to the interactive viewing of images over the Internet. This application is a continuation-in-part of U.S. patent application Ser. No. 08/979,220 filed Nov. 26, 1997.

MICROFICHE APPENDIX

A microfiche appendix forms part of this application and includes Appendix A and Appendix B. Appendix A and Appendix B are described below in a section captioned "LIST OF APPENDICES".

FIELD OF THE INVENTION

BACKGROUND OF THE INVENTION

Internet browsing is implemented through client computers, HTTP server computers and HTTP browsers. Server computers, also referred to as "servers," play the role of archives for commerce, education and entertainment, and client computers, also referred to as "clients," play the role of customers or consumers. Typically many clients connect to a single server. Special server and client software may also be employed, depending on the specific application design architecture.

An Internet browser, such as Microsoft's Internet Explorer or Netscape's Communicator, is a piece of software which resides on a client computer. When executed by a user, the browser opens a Uniform Resource Locator (URL), which resides on a server computer. Typically, the URL is a Hyper-Text Markup Language (HTML) page, which is sent back from the server to the client computer. The HTML page has instructions for the browser, which instruct the browser how to render the page for display. The page typically has additional URLs embedded in it, and when the user clicks on one of them, the server then sends a new HTML page for the browser to render.

HTML pages can contain both text and graphics, along with layout instructions. Images appearing on an HTML page also reside on the server computer, and are sent to the client when the browser finds a link to an image on the HTML page it is rendering, and then instructs the server to send the image data. The beauty of this is that the images reside on remote computers, and do not have to be stored locally on the client. Otherwise, the client would have to store every image it views, either on its hard disk or on a storage medium such as CD-ROM, regularly replacing these images with updates. Memory limitations would severely limit the number of images the client can browse, as compared with the unlimited number available on server computers today. HTML pages can also contain links to programs to run—for example, Java applets.

HTML pages can be either static or dynamic. Static pages are fixed once and for all, and every time the browser accesses such a page, the same page is sent. Dynamic pages are adaptively created by special software residing on the server. In this scenario, when the client accesses such a page, a program executes on the server which generates an HTML page on-the-fly. This page is then sent to the client. A dynamic page can be different every time it is sent to a client. This feature enables a web designer to offer a more customized experience, but requires special server software for its implementation.

Client software can take many forms, such as that of a plug-in for the browser, an Active-X control, a Java applet or a stand alone application. Each form has its relative advantages. For example, plug-ins can be developed full-scale C++ programs, offering a great deal of functionality, but they also require separate installation and are native to a specific platform. Java applets, on the other hand, automatically download from the server and install themselves, triggered by the HTML page, and are cross-platform interoperable, but Java code is more restricted than C++ and performs more slowly. Typically, client software is used as a player or viewer for special multimedia types, such as audio, still image and video, that are embedded in the HTML pages.

Similar to client software, server software can also be native to a specific platform or Java. Typically, server software is used for special access to files stored on the server, and for extra processing of data before sending it. There is often a trade-off between pre-processing data on the server side, before sending it to the client, or having the client process it after the data is received. In extreme cases, an application can be designed with server software doing all of the processing, and no client software at all; or vice versa, client software doing all of the processing, and no server software at all. Again, each choice has its relative advantages. On the one hand, client computers are typically less powerful and have less resources than server computers, indicating an advantage to letting the server do the extra processing. On the other hand, servers have to simultaneously handle many clients, and any drain on server resources inhibits response time to clients, indicating an advantage to letting the client do the extra processing.

The actual data communication between the server and the client is governed by Internet protocols, such as Hyper-Text Transfer Protocol (HTTP) and Internet Imaging Protocol (IIP). These protocols define packets of data to be sent, and can include handshakes for negotiating data-link control, to verify if the data arrived intact. Specifically, the IIP protocol sits as a layer on top of the HTTP protocol, which in turn sits as a layer on top of TCP/IP protocol. Each higher layer is higher level in its functionality; i.e. it deals with more complex data units and communication features. A reference for HTTP is the text "Illustrated Guide to HTTP" by Paul S. Hethmon © 1997 Manning Publications Co., Greenwich, Conn., 1997. A reference for the IIP is the document "Internet Imaging Protocol," ©1997 Hewlett Packard Company, Live Picture, Inc., and Eastman Kodak Company, the contents of which are hereby incorporated by reference.

One of the most challenging Internet applications is interactive viewing of images. Specifically, a large image, for example, a 360 degree panoramic vista, is stored on a server, and selected portions to be viewed are sent to a client in response to user navigation commands. As the user pans left, right, up and down, and zooms in and out of the panorama, the server sends the necessary image data to the client for rendering the appropriate view, thus providing the user with a smooth navigational experience. Effectively, the server enables the user to inspect the image interactively. Most challenging are images having large information content. The sizes of these images can be as large as hundreds of megabytes, depending on the resolution and color depth, making it impractical to simply transmit the entire image from a server to each client.

Another common type of media which is viewed by interactive navigation is large still images, which are larger than the display resolution of a monitor. The user can only view a portion of the image at any given resolution, but is able to navigate in all four directions and zoom in and out interactively, in order to inspect details of the full image.

Implementations of interactive server/client image navigation can vary. Good strategies involve (i) deciding whether or not to use special server and client software, (ii) smart caching of data which will be re-used, (iii) use of data compression, (iv) use of special data communication protocols, (v) user interface design, and much more. One approach, based on assignee's co-pending U.S. patent applications Ser. No. 08/788,830, filed Jan. 6, 1997 and entitled METHOD AND SYSTEMS FOR SCALABLE REPRESENTATION OF MULTIMEDIA DATA FOR PROGRESSIVE ASYNCHRONOUS TRANSMISSION, and Ser. No. 08/813,181, filed Mar. 7, 1997 and entitled METHOD AND SYSTEM FOR ENCODING MOVIES, PANORAMAS AND LARGE IMAGES FOR ON-LINE INTERACTIVE VIEWING AND GAZING, uses no special server software. This approach streams the image data in background, and enables the user to navigate through whatever image data has arrived at the client. A second approach, based on assignee's copending U.S. patent application Ser. No. 08/850,690, filed May 2, 1997 and entitled A METHOD AND SYSTEM FOR PROVIDING ON-LINE INTERACTIVITY OVER A SERVER-CLIENT NETWORK, uses special server software to serve up only the specific image data necessary to satisfy the user's request. A third approach, based on assignee's co-pending U.S. patent application Ser. No. 08/850,787, filed May 2, 1997 and entitled A METHOD AND SYSTEM FOR PROGRESSIVE ENCODING IN AN ACTIVE DESKTOP ENVIRONMENT, combines both of the abovementioned approaches by using a push mode to stream image data in background, together with a pull mode to request specific image data. The contents of the patent applications referred to in this paragraph are all hereby incorporated by reference.

HTML-driven clients for image navigation are known. The user navigation is implemented on the client side by means of dynamic HTML features, obviating the necessity of using any special client software, and making this what is referred to as a client-less architecture. The term "client-less" refers to the absence of special client software. HTML has a feature called image maps, which enables the browser to send back to the server the coordinates within an image corresponding to the location of the mouse pointer when the user clicks on the mouse. This information is used by special server software to generate an HTML page in response to the user interaction.

As described above, static HTML pages were the first and are still the most predominant mode of client/server interaction. Dynamic HTML-driven clients for interactive image navigation was implemented by Kodak in its PixFactory FLASHPIX® application, as described on the web page http://www.informix.com/informix/bussol/iusdb/dbtech/sheets/kpfdm.htm and by New Mexico Software in its IMAGE ASSETS server, as currently demonstrated on its web site at http://www.image-assets.com/cgi-bin/fpiarea.p1/image=01_1.fx/user=demo The drawback with this client-less approach to image navigation is that it is very processing-heavy on the server side. For every interactive user command, the server has to render a customized image to embed in the dynamic HTML page. Given the rapid pace with which interactive user commands are issued, this puts a heavy burden on the server, greatly slowing down its performance. Moreover the combined latency of the server processing and the network communication makes the user experience a "bumpy" rather than a "smooth" interactive experience; i.e. the navigation experience appears more like a slide show than a continuous animation.

SUMMARY OF THE INVENTION

The present invention provides a novel approach to clientless HTML-driven interactive image navigation over the Internet. It operates through the medium of image maps, and is designed in such a way as to allow for efficient caching on both the client and server sides, so as to reduce network latency for the client and also boost server performance.

The invention operates by partitioning the view window, in which the client is displaying changing images as the user navigates. The window region is partitioned in a number of sub-regions. These sub-regions are typically not visible to the user. Whenever the user clicks on the image being displayed, the browser sends the mouse pointer coordinates back to the server. The server then calculates which sub-region these coordinates belong to, and dynamically embeds a corresponding response image into the HTML page being returned to the client. In effect, the user navigation is being "quantized" into a number of possible responses. Typically this number is small (less than 10), and correspondingly, for each image currently being displayed, there are only a small number of different images for display in response to user navigation.

The server's role is simply to identify which of these images is to be displayed in response to a specific interactive user command, and to prepare that image in a form that the browser recognizes, such as JPEG. A primary advantage of this form of quantization is that typically the user will return to the same image over and over. Thus by caching these images within the client, the client provides an instant interactive response whenever the user navigates back to the same image. Moreover, by caching these images within the server, redundant processing for multiple clients can be eliminated, enabling the server to respond quickly to many clients simultaneously.

The present invention also enables a client to interact with an image without the use of image maps, by selecting one of several commands, such as "zoom-in," "zoom-out," "pan," and "reset." The command selected is embedded within an HTTP request dispatched from the client to the server, which the server can parse to extract the selected command. The server uses this command to modify the HTML page, in order to update the image reference contained therein in accordance with the selected command. For example, a "zoom-in" command can be used to effect a centered magnification, by a factor of two, of an image being displayed, and a "zoom-out" command can be used to effect a centered reduction, by a factor of two, of the image. Similarly, a "pan" command can be used to translate the image being displayed by a fixed pre-determined amount, such as half of the width or height of a display window.

A key feature of the present invention is that it operates without the use of special client software, other than an Internet browser which is already resident on the client computer. It enables a server to provide response image data, in response to a user clicking within an image being displayed or clicking on a command button, entirely by means of HTML pages. In particular, a user connected to a web site employing server software operative in accordance with the present invention, can automatically interact with images on the site without the need to download client plug-in software or a client Java applet.

There is thus provided in accordance with a preferred embodiment of the present invention a method for archiving digital data on a server computer, and enabling a user, by means of a client computer, to interactively view a digital image derived from the digital data, including receiving an original HTML page by the client computer from the server computer, the original HTML page containing a view window within which a first image is displayed, the view window being partitioned into sub-regions at least one of which contains a multiplicity of pixels, selecting a location within the view window corresponding to one of the sub-regions by the user, initial sending by the client computer to the server computer an indication of the sub-region selected by the user, creating by the server computer a new HTML page containing a link to an embedded image which corresponds to the indication, and further sending the new HTML page by the server computer to the client computer.

Moreover in accordance with a preferred embodiment of the present invention the selecting step includes positioning a pointer of a mouse input device on a pixel within the view window, and clicking on the mouse input device.

Additionally in accordance with a preferred embodiment of the present invention the indication is the location of the pixel pointed to by the mouse input device.

Further in accordance with a preferred embodiment of the present invention the method also includes the step of identifying that one of the sub-regions within which the pixel location is situated.

Still further in accordance with a preferred embodiment of the present invention the initial sending step also includes sending client state information to the server computer.

Moreover in accordance with a preferred embodiment of the present invention the client state information includes the size and location of the view window.

Additionally in accordance with a preferred embodiment of the present invention the method also includes the step of associating image portions with each of the sub-regions, and wherein the embedded image is that image portion corresponding to that sub-region indicated by the indication.

Moreover in accordance with a preferred embodiment of the present invention some of the image portions are derived from portions of the digital data.

Further in accordance with a preferred embodiment of the present invention some of the image portions correspond to magnified portions of the first image.

Still further in accordance with a preferred embodiment of the present invention some of the image portions correspond to the portions of the first image which lie within the sub-regions associated with the image portions, magnified to the size of the view window.

Moreover in accordance with a preferred embodiment of the present invention some of the image portions correspond to portions of the first image which lie in regions strictly larger than the sub-regions associated with the image portions, magnified to the size of the view window.

Further in accordance with a preferred embodiment of the present invention some of the image portions extend outside of the first image.

Additionally in accordance with a preferred embodiment of the present invention the creating step is implemented by means of a Java server.

Moreover in accordance with a preferred embodiment of the present invention the creating step is implemented by means of a Java servlet.

Further in accordance with a preferred embodiment of the present invention the link to an embedded image is a sequence of commands forming part of the Internet Imaging Protocol (IIP).

Still further in accordance with a preferred embodiment of the present invention the sequence of commands forming part of the IIP includes a convert (CVT) command.

Moreover in accordance with a preferred embodiment of the present invention the sequence of commands forming part of the IIP includes a region (RGN) command.

Additionally in accordance with a preferred embodiment of the present invention the sequence of commands forming part of the IIP includes a width (WID) command.

Further in accordance with a preferred embodiment of the present invention the sequence of commands forming part of the IIP includes a height (HEI) command.

Still further in accordance with a preferred embodiment of the present invention the digital data is a tiled multi-resolution image file, such as a FLASHPIX® image file.

Moreover in accordance with a preferred embodiment of the present invention the embedded image is built from tiles within a multi-resolution image file, such as a FLASHPIX® image file.

There is also provided in accordance with a preferred embodiment of the present invention a method for interactive viewing of a digital image by a user, the viewing being controlled by a client computer, employing digital data residing on a server computer, including receiving an original HTML page by the client computer from the server, the original HTML page containing a view window within which image data is displayed, the view window being partitioned into sub-regions at least one of which contains a multiplicity of pixels, selecting a location within the view window corresponding to one of the sub-regions by the user, and receiving a new HTML page by the client computer from the server computer, in response to the sub-region which was selected.

Moreover in accordance with a preferred embodiment of the present invention the selecting step includes positioning a pointer of a mouse input device on a pixel within the view window, and clicking on the mouse input device.

Additionally in accordance with a preferred embodiment of the present invention the digital data is a tiled multi-resolution image file, such as a FLASHPIX® image file.

Further in accordance with a preferred embodiment of the present invention the new HTML page contains a link to an embedded image.

Still further in accordance with a preferred embodiment of the present invention the link to an embedded image is a sequence of commands forming part of the Internet Imaging Protocol (IIP).

Moreover in accordance with a preferred embodiment of the present invention the sequence of commands forming part of the IIP includes a convert (CVT) command.

Additionally in accordance with a preferred embodiment of the present invention the sequence of commands forming part of the IIP includes a region (RGN) command.

Further in accordance with a preferred embodiment of the present invention the sequence of commands forming part of the IIP includes a width (WID) command.

Still further in accordance with a preferred embodiment of the present invention the sequence of commands forming part of the IIP includes a height (HEI) command.

Moreover in accordance with a preferred embodiment of the present invention the embedded image is built from tiles within a multi-resolution image file, such as a FLASHPIX® image file.

There is also provided in accordance with a preferred embodiment of the present invention a method for generating dynamic HTML pages on a server computer, to enable a user to interactively view a digital image on a client computer within a view window which is partitioned into sub-regions at least one of which contains a multiplicity of pixels, by interactive selecting of sub-regions by the user, including receiving from the client computer an indication of which of the sub-regions is selected by the user, creating an HTML page containing a link to an embedded image which corresponds to the indication, and sending the HTML page to the client computer.

Moreover in accordance with a preferred embodiment of the present invention the indication is the location of a pixel pointed to by a mouse input device attached to the client computer.

Additionally in accordance with a preferred embodiment of the present invention the method also includes the step of identifying that sub-region within which the pixel location is situated.

Further in accordance with a preferred embodiment of the present invention the receiving step also includes receiving client state information.

Still further in accordance with a preferred embodiment of the present invention the client state information includes the size and location of the view window.

Moreover in accordance with a preferred embodiment of the present invention the method also includes including the step of associating image portions with each of the sub-regions, and wherein the embedded image is that image portion corresponding to the sub-region indicated by the indication.

Additionally in accordance with a preferred embodiment of the present invention the creating step is implemented by means of a Java server.

Moreover in accordance with a preferred embodiment of the present invention the creating step is implemented by means of a Java servlet.

Further in accordance with a preferred embodiment of the present invention the link to an embedded image is a sequence of commands forming part of the Internet Imaging Protocol (IIP).

Still further in accordance with a preferred embodiment of the present invention the sequence of commands forming part of the IIP includes a convert (CVT) command.

Moreover in accordance with a preferred embodiment of the present invention the sequence of commands forming part of the IIP includes a region (RGN) command.

Additionally in accordance with a preferred embodiment of the present invention the sequence of commands forming part of the IIP includes a width (WID) command.

Further in accordance with a preferred embodiment of the present invention the sequence of commands forming part of the IIP includes a height (HEI) command.

Still further in accordance with a preferred embodiment of the present invention the digital image is a tiled multi-resolution image, such as a FLASHPIX® image.

Moreover in accordance with a preferred embodiment of the present invention the embedded image is built from tiles within a multi-resolution image file, such as a FLASHPIX® image file.

There is also provided in accordance with a preferred embodiment of the present invention an archival system for archiving digital data on a server computer, and enabling a user, by means of a client computer, to interactively view a digital image derived from the digital data, including a first communication channel for receiving an original HTML page by the client computer from the server computer and for subsequently sending a new HTML page by the server computer to the client computer, the original HTML page containing a view window within which a first image is displayed, the view window being partitioned into sub-regions at least one of which contains a multiplicity of pixels, an input device for enabling the user to select a location within the view window corresponding to one of the sub-regions, a second communication channel for sending by the client computer to the server computer an indication of the sub-region selected by the user, and a processor for creating by the server computer the new HTML page containing a link to an embedded image which corresponds to the indication.

Additionally in accordance with a preferred embodiment of the present invention the input device is a keyboard.

Moreover in accordance with a preferred embodiment of the present invention the input device includes a mouse input device for positioning a pointer on a pixel within the view window, and a mouse key for clicking on the mouse input device.

Additionally in accordance with a preferred embodiment of the present invention the indication is the location of the pixel pointed to by the mouse input device.

Further in accordance with a preferred embodiment of the present invention the system also includes a coordinate processor for identifying that one sub-regions within which the pixel location is situated.

Still further in accordance with a preferred embodiment of the present invention the second communication channel is also used to send client state information to the server computer.

Moreover in accordance with a preferred embodiment of the present invention the client state information includes the size and location of the view window.

Additionally in accordance with a preferred embodiment of the present invention the system also includes a list of image portions for associating image portions with each of the sub-regions, and wherein the embedded image is that image portions corresponding to the sub-region indicated by the indication.

Moreover in accordance with a preferred embodiment of the present invention some of the image portions are derived from portions of the digital data.

Further in accordance with a preferred embodiment of the present invention some of the image portions correspond to magnified portions of the first image.

Still further in accordance with a preferred embodiment of the present invention some of the image portions correspond to the portions of the first image which lie within the sub-regions associated with the image portions, magnified to the size of the view window.

Moreover in accordance with a preferred embodiment of the present invention some of the image portions correspond to portions of the first image which lie in regions strictly larger than the sub-regions associated with the image portions, magnified to the size of the view window.

Further in accordance with a preferred embodiment of the present invention some of the image portions extend outside of the first image.

Additionally in accordance with a preferred embodiment of the present invention the processor is a Java server.

Moreover in accordance with a preferred embodiment of the present invention the processor is a Java servlet.

Further in accordance with a preferred embodiment of the present invention the link to an embedded image is a sequence of commands forming part of the Internet Imaging Protocol (IIP).

Still further in accordance with a preferred embodiment of the present invention the sequence of commands forming part of the IIP includes a convert (CVT) command.

Moreover in accordance with a preferred embodiment of the present invention the sequence of commands forming part of the IIP includes a region (RGN) command.

Additionally in accordance with a preferred embodiment of the present invention the sequence of commands forming part of the IIP includes a width (WID) command.

Further in accordance with a preferred embodiment of the present invention the sequence of commands forming part of the IIP includes a height (HEI) command.

Still further in accordance with a preferred embodiment of the present invention the digital data is a tiled multi-resolution image file, such as a FLASHPIX® image file.

Moreover in accordance with a preferred embodiment of the present invention the embedded image is built from tiles within a multi-resolution file, such as a FLASHPIX® image file.

There is also provided in accordance with a preferred embodiment of the present invention a client viewing system for interactive viewing of a digital image by a user, the viewing being controlled by a client computer, employing digital data residing on a server computer, including a communication channel for receiving an original HTML page by the client computer from the server computer, the original HTML page containing a view window within which image data is displayed, the view window being partitioned into a plurality of sub-regions at least one of which contains a multiplicity of pixels, an input device for enabling the user to select a location within the view window corresponding to one of the sub-regions, and a communication channel for receiving a new HTML page by the client computer from the server computer, in response to the sub-region which was selected.

Additionally in accordance with a preferred embodiment of the present invention the input device is a keyboard.

Further in accordance with a preferred embodiment of the present invention the input device includes a mouse input device for positioning a pointer on a pixel within the view window, and a mouse key for clicking on the mouse input device.

Still further in accordance with a preferred embodiment of the present invention the digital data is a tiled multi-resolution image file, such as a FLASHPIX® image file.

Moreover in accordance with a preferred embodiment of the present invention the new HTML page contains a link to an embedded image.

Additionally in accordance with a preferred embodiment of the present invention the link to an embedded image is a sequence of commands forming part of the Internet Imaging Protocol (IIP).

Further in accordance with a preferred embodiment of the present invention the sequence of commands forming part of the IIP includes a convert (CVT) command.

Still further in accordance with a preferred embodiment of the present invention the sequence of commands forming part of the IIP includes a region (RGN) command.

Moreover in accordance with a preferred embodiment of the present invention the sequence of commands forming part of the IIP includes a width (WID) command.

Additionally in accordance with a preferred embodiment of the present invention the sequence of commands forming part of the IIP includes a height (HEI) command.

Further in accordance with a preferred embodiment of the present invention the embedded image is built from tiles within a multi-resolution image file, such as a FLASHPIX® image file.

There is also provided in accordance with a preferred embodiment of the present invention a server dynamic HTML system for generating dynamic HTML pages on a server computer, to enable a user to interactively view a digital image on a client computer within a view window which is partitioned into sub-regions at least one of which contains a multiplicity of pixels, by interactive selecting of sub-regions by the user, including a first communication channel for receiving from the client computer an indication of which of the sub-regions is selected by the user, a processor for creating an HTML page containing a link to an embedded image which corresponds to the indication, and a second communication channel for sending the HTML page to the client computer.

Moreover in accordance with a preferred embodiment of the present invention the indication is the location of a pixel pointed to by a mouse input device attached to the client computer.

Additionally in accordance with a preferred embodiment of the present invention the system also includes a coordinate processor for identifying that sub-region within which the pixel location is situated.

Further in accordance with a preferred embodiment of the present invention the first communication channel also receives client state information.

Still further in accordance with a preferred embodiment of the present invention the client state information includes the size and location of the view window.

Moreover in accordance with a preferred embodiment of the present invention the system also includes a list of image portions for associating image portions with each of the sub-regions, and wherein the embedded image is that image portion corresponding to the sub-region indicated by the indication.

Additionally in accordance with a preferred embodiment of the present invention the processor is a Java server.

Moreover in accordance with a preferred embodiment of the present invention the processor is a Java servlet.

Further in accordance with a preferred embodiment of the present invention the link to an embedded image is a sequence of commands forming part of the Internet Imaging Protocol (IIP).

Still further in accordance with a preferred embodiment of the present invention the sequence of commands forming part of the IIP includes a convert (CVT) command.

Moreover in accordance with a preferred embodiment of the present invention the sequence of commands forming part of the IIP includes a region (RGN) command.

Further in accordance with a preferred embodiment of the present invention the sequence of commands forming part of the IIP includes a width (WID) command.

Still further in accordance with a preferred embodiment of the present invention the sequence of commands forming part of the IIP includes a height (HEI) command.

Moreover in accordance with a preferred embodiment of the present invention the digital image is a tiled multi-resolution image, such as a FLASHPIX® image.

Additionally in accordance with a preferred embodiment of the present invention the embedded image is built from tiles within a multi-resolution image file, such as a FLASHPIX® image file.

There is also provided in accordance with a preferred embodiment of the present invention a method for archiving digital data on a computer and enabling a user to interactively view a digital image derived from the digital data, including receiving from the computer a layout containing a view window within which an image is displayed, the view window being partitioned into sub-regions at least one of which contains a multiplicity of pixels, selecting a location within the view window corresponding to one of the sub-regions by the user, and providing by the computer to the user a layout containing a reference to an image which corresponds to the sub-region selected by the user.

Moreover in accordance with a preferred embodiment of the present invention the selecting step includes positioning a pointer of a mouse input device on a pixel within the view window, and clicking on the mouse input device.

Additionally in accordance with a preferred embodiment of the present invention the method also includes the step of associating image portions with each of the sub-regions, and wherein the reference to an image is a reference to that image portion corresponding to the sub-region selected by the user.

Further in accordance with a preferred embodiment of the present invention some of the image portions are derived from portions of the digital data.

Still further in accordance with a preferred embodiment of the present invention the digital data is a tiled multi-resolution image file, such as a FLASHPIX® image file.

Moreover in accordance with a preferred embodiment of the present invention the reference to an image is a reference to a multi-resolution image, such as a FLASHPIX® image.

There is also provided in accordance with a preferred embodiment of the present invention a system for archiving digital data on a computer and enabling a user to interactively view a digital image derived from the digital data, including apparatus providing a layout containing a view window within which an image is displayed, the view window being partitioned into sub-regions at least one of which contains a multiplicity of pixels, an input device for enabling a user to select a location within the view window corresponding to one of the sub-regions, and apparatus providing a layout containing a reference to an image which corresponds to the sub-region selected by the user.

Moreover in accordance with a preferred embodiment of the present invention the input device includes a mouse input device for positioning a pointer on a pixel within the view window, and a mouse key for clicking on the mouse input device.

Additionally in accordance with a preferred embodiment of the present invention the system also includes a list of image portions for associating image portions with each of the sub-regions, and wherein the reference to an image is a reference to that image portion corresponding to the sub-region selected by the user.

Further in accordance with a preferred embodiment of the present invention some of the image portions are derived from portions of the digital data.

Still further in accordance with a preferred embodiment of the present invention the digital data is a tiled multi-resolution image file, such as a FLASHPIX® image file.

Moreover in accordance with a preferred embodiment of the present invention the reference to an image is a reference to a multi-resolution image, such as a FLASHPIX® image.

There is also provided in accordance with a preferred embodiment of the present invention a method for archiving digital data on a server computer, and enabling a user, by means of a client computer, to interactively view a digital image derived from the digital data, including receiving an original HTML page by the client computer from the server computer, the original HTML page containing a view window within which a first image is displayed, selecting a command by the user, initial sending by the client computer to the server computer an indication of the command selected by the user, creating by the server computer a new HTML page containing a link to an embedded image which corresponds to the indication, and further sending the new HTML page by the server computer to the client computer.

Moreover in accordance with a preferred embodiment of the present invention the original HTML page contains at least one button, and the selecting step includes positioning a pointer of a mouse input device on a selected button within the original HTML page, and clicking on the button.

Additionally in accordance with a preferred embodiment of the present invention the indication is an index associated with the selected button.

Further in accordance with a preferred embodiment of the present invention the first sending step also includes sending client state information to the server computer.

Still further in accordance with a preferred embodiment of the present invention the client state information includes the size and location of the view window.

Moreover in accordance with a preferred embodiment of the present invention the client state information includes an indication of the region within the digital image occupied by the first image.

Additionally in accordance with a preferred embodiment of the present invention the client state information includes an indication of the region within the digital image initially occupied by the first image.

Further in accordance with a preferred embodiment of the present invention the link to an embedded image is a sequence of commands forming part of the Internet Imaging Protocol (IIP).

Still further in accordance with a preferred embodiment of the present invention the sequence of commands forming part of the IIP includes a convert (CVT) command.

Moreover in accordance with a preferred embodiment of the present invention the digital data is a tiled multi-resolution image file, such as a FLASHPIX® image file.

Additionally in accordance with a preferred embodiment of the present invention the embedded image is built from tiles within a multi-resolution image file, such as a FLASHPIX® image file.

There is also provided in accordance with a preferred embodiment of the present invention a method for interactive viewing of a digital image by a user, the viewing being controlled by a client computer, employing digital data residing on a server computer, including receiving an original HTML page by the client computer from the server computer, the original HTML page containing a view window within which image data is displayed, selecting a command by the user, and receiving a new HTML page by the client computer, said new HTML page containing a link to an embedded image which corresponds to the command.

Moreover in accordance with a preferred embodiment of the present invention the selecting step includes positioning a pointer of a mouse input device on a selected button within the original HTML page, and clicking on the selected button.

Additionally in accordance with a preferred embodiment of the present invention the digital data is a tiled multi-resolution image file, such as a FLASHPIX® image file.

Further in accordance with a preferred embodiment of the present invention the link to an embedded image is a sequence of commands forming part of the Internet Imaging Protocol (IIP).

Still further in accordance with a preferred embodiment of the present invention the sequence of commands forming part of the IIP includes a convert (CVT) command.

Moreover in accordance with a preferred embodiment of the present invention the embedded image is built from tiles within a multi-resolution image file, such as a FLASHPIX® image file.

There is also provided in accordance with a preferred embodiment of the present invention a method for generating dynamic HTML pages on a server computer, to enable a user to interactively view a digital image on a client computer, by interactive selection of a command by the user, including receiving from the client computer an indication of which command is selected by the user, creating an HTML page containing a link to an embedded image which corresponds to the indication, and sending the HTML page to the client computer.

Moreover in accordance with a preferred embodiment of the present invention the indication is an index associated with the selected command.

Additionally in accordance with a preferred embodiment of the present invention the receiving step also includes receiving client state information.

Further in accordance with a preferred embodiment of the present invention the link to an embedded image is a sequence of commands forming part of the Internet Imaging Protocol (IIP).

Still further in accordance with a preferred embodiment of the present invention the sequence of commands forming part of the IIP includes a convert (CVT) command.

Moreover in accordance with a preferred embodiment of the present invention the digital image is a tiled multi-resolution image, such as a FLASHPIX® image.

Additionally in accordance with a preferred embodiment of the present invention the embedded image is built from tiles within a multi-resolution image file, such as a FLASHPIX® image file.

There is also provided in accordance with a preferred embodiment of the present invention an archival system for archiving digital data on a server computer, and enabling a user, by means of a client computer, to interactively view a digital image derived from the digital data, including a first communication channel for receiving an original HTML page by the client computer from the server computer and for subsequently sending a new HTML page by the server computer to the client computer, the original HTML page containing a view window within which a first image is displayed, an input device for enabling a user to select a command by the user, a second communication channel for sending by the client computer to the server computer an indication of the command selected by the user, and a processor for creating by the server computer the new HTML page with a link to an embedded image which corresponds to the indication.

Moreover in accordance with a preferred embodiment of the present invention the input device is a keyboard.

Additionally in accordance with a preferred embodiment of the present invention the input device is a mouse input device.

Further in accordance with a preferred embodiment of the present invention the second communication channel also sends client state information to the server computer.

Still further in accordance with a preferred embodiment of the present invention the client state information includes the size and location of the view window.

Moreover in accordance with a preferred embodiment of the present invention the client state information includes an indication of the region within the digital image occupied by the first image.

Additionally in accordance with a preferred embodiment of the present invention the client state information includes an indication of the region within the digital image initially occupied by the first image.

Moreover in accordance with a preferred embodiment of the present invention the link to an embedded image is a sequence of commands forming part of the Internet Imaging Protocol (IIP).

Additionally in accordance with a preferred embodiment of the present invention the sequence of commands forming part of the IIP includes a convert (CVT) command.

Further in accordance with a preferred embodiment of the present invention the digital data is a tiled multi-resolution image file, such as a FLASHPIX® image file.

Still further in accordance with a preferred embodiment of the present invention the embedded image is built from tiles within a multi-resolution image file, such as a FLASHPIX® image file.

There is also provided in accordance with a preferred embodiment of the present invention a client viewing system for interactive viewing of a digital image by a user, the viewing being controlled by a client computer, employing digital data residing on a server computer, including a communication channel for receiving an original HTML page by the client computer from the server computer, the original HTML page containing a view window within which image data is displayed, an input device for enabling a user to select a command, and a communication channel for receiving a new HTML page by the client computer from the server computer, said new HTML page containing a link to an embedded image which corresponds to the command, in response to the command which was selected.

Moreover in accordance with a preferred embodiment of the present invention the input device is a keyboard.

Additionally in accordance with a preferred embodiment of the present invention the input device is a mouse input device.

Further in accordance with a preferred embodiment of the present invention the digital data is a tiled multi-resolution image file, such as a FLASHPIX® image file.

Still further in accordance with a preferred embodiment of the present invention the link to an embedded image is a sequence of commands forming part of the Internet Imaging Protocol (IIP).

Moreover in accordance with a preferred embodiment of the present invention the sequence of commands forming part of the IIP includes a convert (CVT) command.

Additionally in accordance with a preferred embodiment of the present invention the embedded image is built from tiles within a multi-resolution image file, such as a FLASHPIX® image file.

There is also provided in accordance with a preferred embodiment of the present invention a server dynamic HTML system for generating dynamic HTML pages on a server computer, to enable a user to interactively view a digital image on a client computer, by interactive selecting of commands by the user from among a plurality of commands, including a first communication channel for receiving from the client computer an indication of which of the commands is selected by the user, a processor for creating an HTML page containing a link to an embedded image which corresponds to the indication, and a second communication channel for sending the HTML page to the client computer.

Moreover in accordance with a preferred embodiment of the present invention the indication is an index associated with the selected command.

Additionally in accordance with a preferred embodiment of the present invention the first communication channel also receives client state information.

Further in accordance with a preferred embodiment of the present invention the link to an embedded image is a sequence of commands forming part of the Internet Imaging Protocol (IIP).

Still further in accordance with a preferred embodiment of the present invention the sequence of commands forming part of the IIP includes a convert (CVT) command.

Moreover in accordance with a preferred embodiment of the present invention the digital image is a tiled multi-resolution image, such as a FLASHPIX® image.

Further in accordance with a preferred embodiment of the present invention the embedded image is built from tiles within a multi-resolution image file, such as a FLASHPIX® image file.

There is also provided in accordance with a preferred embodiment of the present invention a method for archiving digital data on a computer and enabling a user to interactively view a digital image derived from the digital data, including receiving from the computer a layout containing a view window within which an image is displayed, selecting a command by the user, and providing by the computer to the user a layout containing a reference to an image which corresponds to the command selected by the user.

Moreover in accordance with a preferred embodiment of the present invention the selecting step includes positioning a pointer of a mouse input device on a selected button within the layout, and clicking on the button.

Additionally in accordance with a preferred embodiment of the present invention the digital data is a tiled multi-resolution image file, such as a FLASHPIX® image file.

Further in accordance with a preferred embodiment of the present invention the reference to an image is a reference to a multi-resolution image, such as a FLASHPIX® image.

There is also provided in accordance with a preferred embodiment of the present invention a system for archiving digital data on a computer and enabling a user to interactively view a digital image derived from the digital data, including apparatus providing an original layout containing a view window within which an image is displayed, an input device for enabling the user to select a command, and apparatus providing a new layout containing a reference to an image which corresponds to the command selected by the user.

Moreover in accordance with a preferred embodiment of the present invention the input device includes a mouse input device for positioning a pointer on a button within the original layout, and a mouse key for clicking on the mouse input device.

Additionally in accordance with a preferred embodiment of the present invention the digital data is a tiled multi-resolution image file, such as a FLASHPIX® image file.

Further in accordance with a preferred embodiment of the present invention the reference to an image is a reference to a multi-resolution image, such as a FLASHPIX® image.

BRIEF DESCRIPTION OF THE DRAWINGS

FIG. 7 is a diagram illustrating a partition of an image into sub-regions for the purpose of panning in accordance with a preferred embodiment of the present invention.

LIST OF APPENDICES

Figure 1:
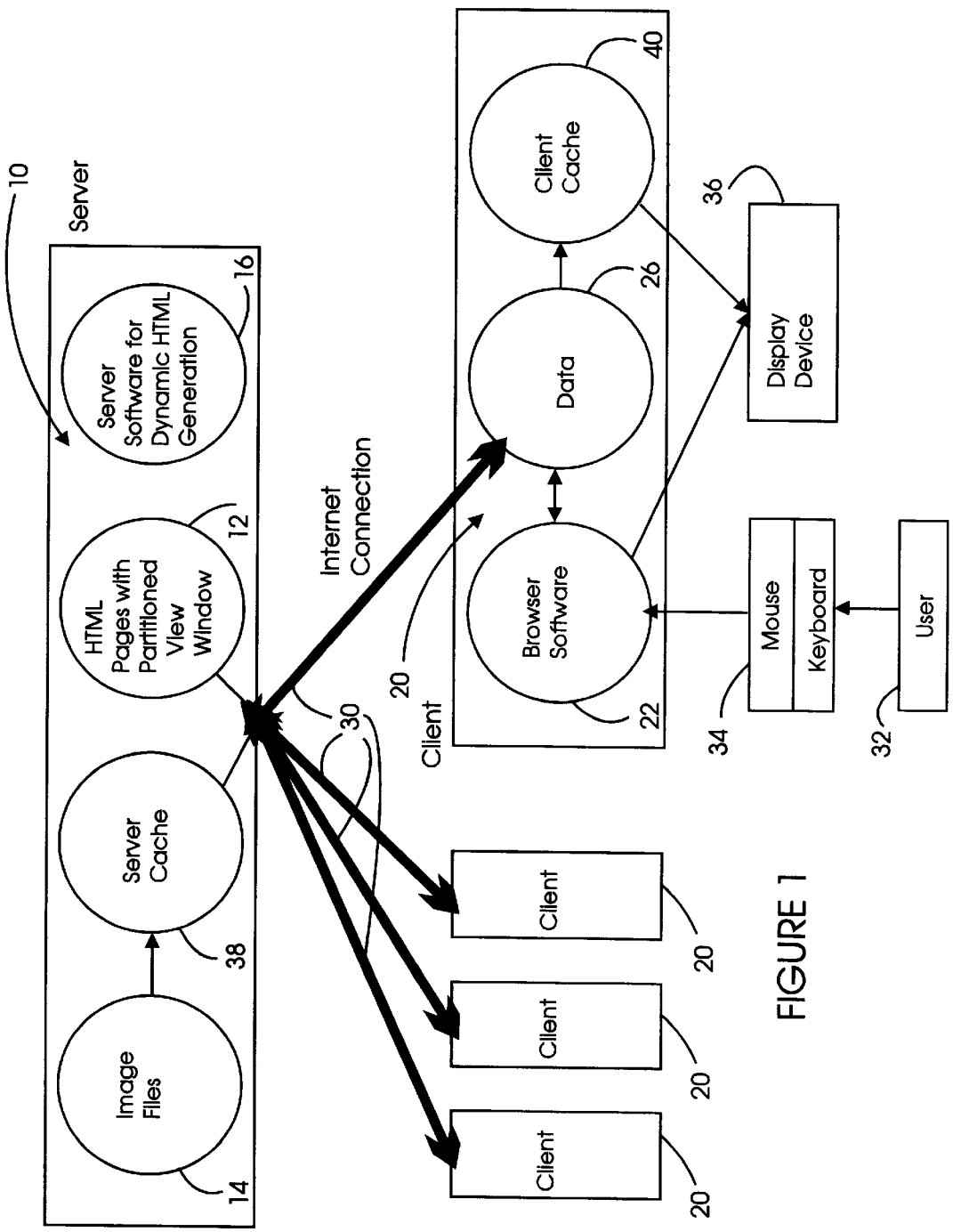
FIG. 1 is a simplified diagram illustrating an Internet communication configuration between a client and a server.

Appendix A is a listing of four HTML pages, the first corresponding to an initial image view, the second corresponding to a zoomed-in view, the third corresponding to a view that can be panned, and the fourth being a template.

Appendix B is a listing of sample server-side software, in the form of a Java server, for supporting the HTML-driven client, according to a preferred embodiment of the present invention.

DETAILED DESCRIPTION OF PREFERRED EMBODIMENTS

The present invention concerns a client/server architecture for interactive viewing of image data. Specifically, it deals with large images, where the full resolution image cannot be downloaded over the Internet quickly, and also may not fit within a viewing window on a computer monitor. Instead the user can view only a portion of the image at any given instant, and inspects the image by interactively manipulating it so that various portions, possibly at various resolutions, are displayed in the view window in response to user commands.

The basic units of interactivity when viewing large images are pan and zoom. Panning involves sliding the portion of the image being viewed left, right, up and down. Zooming involves zooming in on parts of the image (magnification) to see finer detail, and zooming out (reduction) to see a larger portion of the image, with less detail, in the same view window.

When viewing flat 2-D images, the portion of the image being viewed is based directly upon the stored image data. When viewing panoramas (360 degree vistas), which are mapped onto geometrical surfaces such as cylinders or spheres, the portion of the image being viewed is transformed from stored image data, corresponding to the appropriate projection that maps the surface onto the current view plane along the lines of sight of the viewer. Each view requires a distinct transformations for its view plane.

Client/server systems operate by archiving the image data on a server computer, and enabling client computers to connect via the Internet and access the image data. In this way, the image data is made available to a broad audience of users, and it is not necessary for the client computers to store a local copy of the image data. This is especially advantageous in light of the large size of the image data files, and the limited memory resources on the client computer. Client/server systems make it possible for users to view an unlimited number of images.

A primary drawback with client/server systems is network latency, which causes delays in data access via the Internet. Waiting for large amounts of data to download is annoying to users, and thus interactive application designers prefer to operate by transmitting just enough data for rendering the image portion to be displayed. However, for both flat 2-D and panoramic images, in order to render the portion of the image to be displayed, the client computer has to have received a corresponding portion of the archived image data from the server computer. This in turn requires that new data be transmitted in response to each interactive user command, which leads to a non-smooth interactive user experience, whereby the navigation appears to proceed in "spurts."

For multimedia such as flat 2-D images and panoramas, whereby the user typically accesses the same data repeatedly while navigating, caching can alleviate the network latency problem to a limited extent. Ideally the user experience should be independent of whether the images being viewed are stored remotely on servers or locally on the user's disk.

Referring to FIG. 1, there is depicted a simplified diagram of a client/server system. As is known in the prior art, a server computer 10 contains HTML pages 12, each of which contains display layout information, URL links for embedding images, and instructions to launch server applications such as Java applications, referred to as "Java servers," and Java applets, referred to as "Java servlets." The embedded images are derived from image files 14 residing on the server, and the server applications are stored as server software 16 on the server.

In accordance with a preferred embodiment of the present invention, the HTML pages 12 contain viewing windows which are partitioned into a plurality of sub-regions, and the server software is used to dynamically generate HTML pages in response to user selection of sub-regions.

At remote sites several client computers 20 are connected to the server 10. Each client computer contains browser software 22, such as Netscape Navigator or Microsoft Internet Explorer. The browser software 22 communicates with the server computer 10, and controls transmission of data 26, which includes HTML, applet, image and other data, from the server to the client. The data 26 is either used directly by the browser to display the HTML page, or, if necessary or preferred, the optional client software 24 is invoked.

The vehicle for connecting the clients to the server is the Internet, with its multitude of connections 30. Requests for data along such a connection should comply with an Internet protocol, such as HTTP's GET command, or those of other protocols such as FTP or SMTP.

A user 32, who operates the client computer 20, interactively controls the image portion displayed within the HTML page by means of an input device such as a mouse and keyboard 34. The HTML page with the image portion embedded therein is displayed on a display device 36. The user 32 views the display screen and in turn adjusts the image portion being viewed by issuing commands via the mouse and keyboard 34.

Additionally, the server can use its local cache 38 to store image data that can be repeatedly requested. This is especially efficient if the data portions transmitted from server to client require special assembly from the data in the image files 14. In a preferred embodiment of the present invention, the image files 14 are FLASHPIX® files. FLASHPIX® is a multi-resolution tiled format. Specifically, a high resolution image is pre-filtered into a pyramid of lower resolution images, all of which are stored with the full resolution image within the FLASHPIX® file. In addition, all of the individual resolution images are partitioned into tiles, which are blocks of contiguous image data. Currently the FLASHPIX® format employs tiles of 64×64 pixels. The tiles can be individually compressed. A reference for FLASHPIX® is the document "FlashPix Format Specification," ©1996, 1997, Eastman Kodak Company.

In order to construct a specific image portion at a specific resolution, it is necessary to assemble ("stitch") together all of the tiles from the specific resolution that are part of the specific portion. For example, generating a 256×256 image portion from a given resolution may involve assembling a 4×4 array of tiles. An application may be designed so as to send the tiles directly to the client, unassembled, in which case the client has to assemble them by means of client software in the form of a plug-in, Active-X control or Java applet.

Alternatively, an application may be designed to have the server do the assembly, and transmit the assembled image portion to the client. In this case, the browser software 22 may be able to display the image portion directly, without the need to use client software.

Complementing FLASHPIX®, there exists the Internet Imaging Protocol (IIP), which is a set of commands for requesting data from a FLASHPIX® image file. When the application operates by sending unassembled tiles from the server 10 to the client 20, the client issues a tile (TIL) command, specifying a single tile or multiple tiles to be transmitted. In turn, the client receives each tile individually, typically in compressed format.

Alternatively, when the application operates by assembling the tiles into an image portion on the server, the client issues a convert (CVT) command, specifying a rectangular region of the image along with a display resolution. The server then functions to identify which resolution in the FLASHPIX® image pyramid is appropriate for the specified region and display resolution, and which tiles are required. It extracts those tiles from the image file, assembles them together into a rectangular image portion, and typically compresses the resulting image. The final result is transmitted to the client for display.

Server cache 38 can be used to save assembled image portions for re-use, in case other clients request the same image portion, or in case the same client navigates back to the same image portion. Having image portions available saves the assembly processing, yielding faster response time.

Similarly a client cache 40 can also be used to store image portions for future re-use. On account of the limited memory available for caching, both servers and clients have to implement smart caching algorithms when their caches are full, to decide what data to keep and what data to discard.

Figure 2:
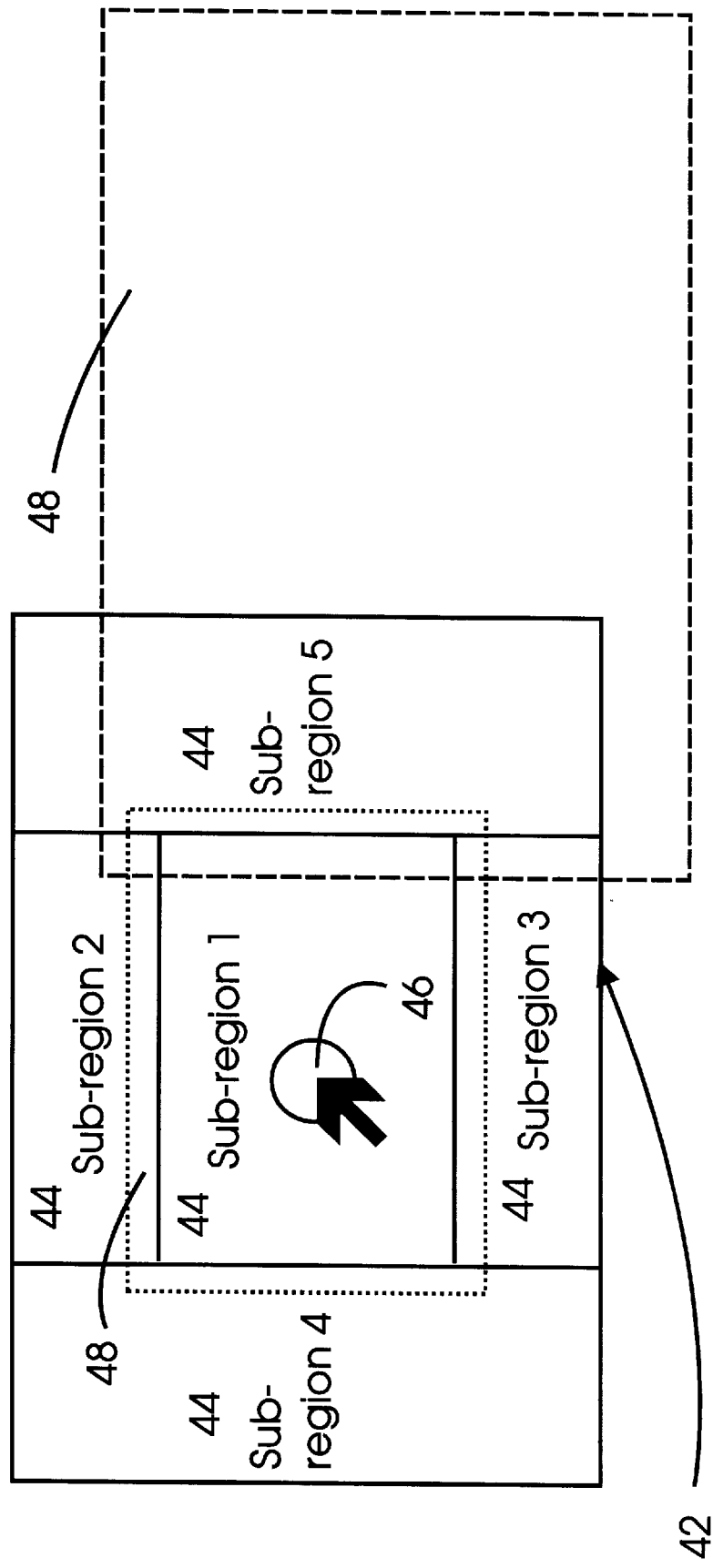
FIG. 2 is a diagram illustrating a partition of an image region into sub-regions for the purpose of zooming.

Referring now to FIG. 2, there is shown a viewing window 42, which is typically part of an HTML page layout. The image portion being viewed by the user is displayed in this window. In a preferred embodiment of the present invention, the viewing window 42 is partitioned into imaginary sub-regions 44. These sub-regions are imaginary in the sense that they are not visible to the user, but are used for computational purposes.

FIG. 2 illustrates an example of zooming in. The user positions a mouse pointer 46 at a position within the view window, and clicks on the mouse. This issues a request to zoom in on the portion of the image where the mouse pointer is located. In a preferred embodiment, the present invention operates by identifying a specific image portion, associated with the sub-region containing the mouse pointer 46, to be magnified.

FIG. 2 illustrates a partition containing five sub-regions 44, indicated by the solid lines in FIG. 2. The user selects one of these sub-regions by clicking at a location in the view window. In turn, each of these sub-regions is used to trigger the server to embed an appropriate image portion in the server's response. Specifically, in a preferred embodiment of the present invention, each of these sub-regions is associated with a rectangular region 48, indicated for sub-region 1 by the dotted lines in FIG. 2. When the user clicks within a particular sub-region 44, the image portion to be used for the response is the region 48 associated with that selected sub-region 44.

Shown in FIG. 2 are two examples of response regions 48. The first example is the region marked by the dotted lines. It contains sub-region 1, but is itself contained with the view window. The response image portion is magnified to fit the size of the full view window, giving the effect of a zoom-in.

The advantage of choosing response regions 48 that are strictly larger than the sub-regions 44, is that when the user clicks on the boundary of a sub-region, the location clicked upon is strictly within the image portion displayed in response, making it easy for the user to relate the response image to the previous image. However, it is apparent that one could instead choose the response regions to coincide with the sub-regions, or in almost any arbitrary way.

The second example of a response region in FIG. 2 is the region surrounded by the dashed lines. It is the same size as the view window, but extends rightward and downward outside the current image data being viewed. Display of this image portion gives the effect of an upward leftward motion.

Internet browsers provide a mechanism, referred to as image maps, for carrying out this process. Image maps enable a browser to extract the coordinates of the location of the mouse pointer when the user clicks on the mouse, and send these coordinates back to the server. The server in turn receives these coordinates and calculates that sub-region within which they are situated. FIG. 2 illustrates a user clicking within sub-region 1.

In order to calculate the sub-region within which the mouse coordinates are located, the server also needs to know the size and location of the view window; i.e. client state information. This client state information can also be sent from the client to the server, together with the mouse coordinates. Alternatively, the server can store this information in its own memory.

Figure 3:
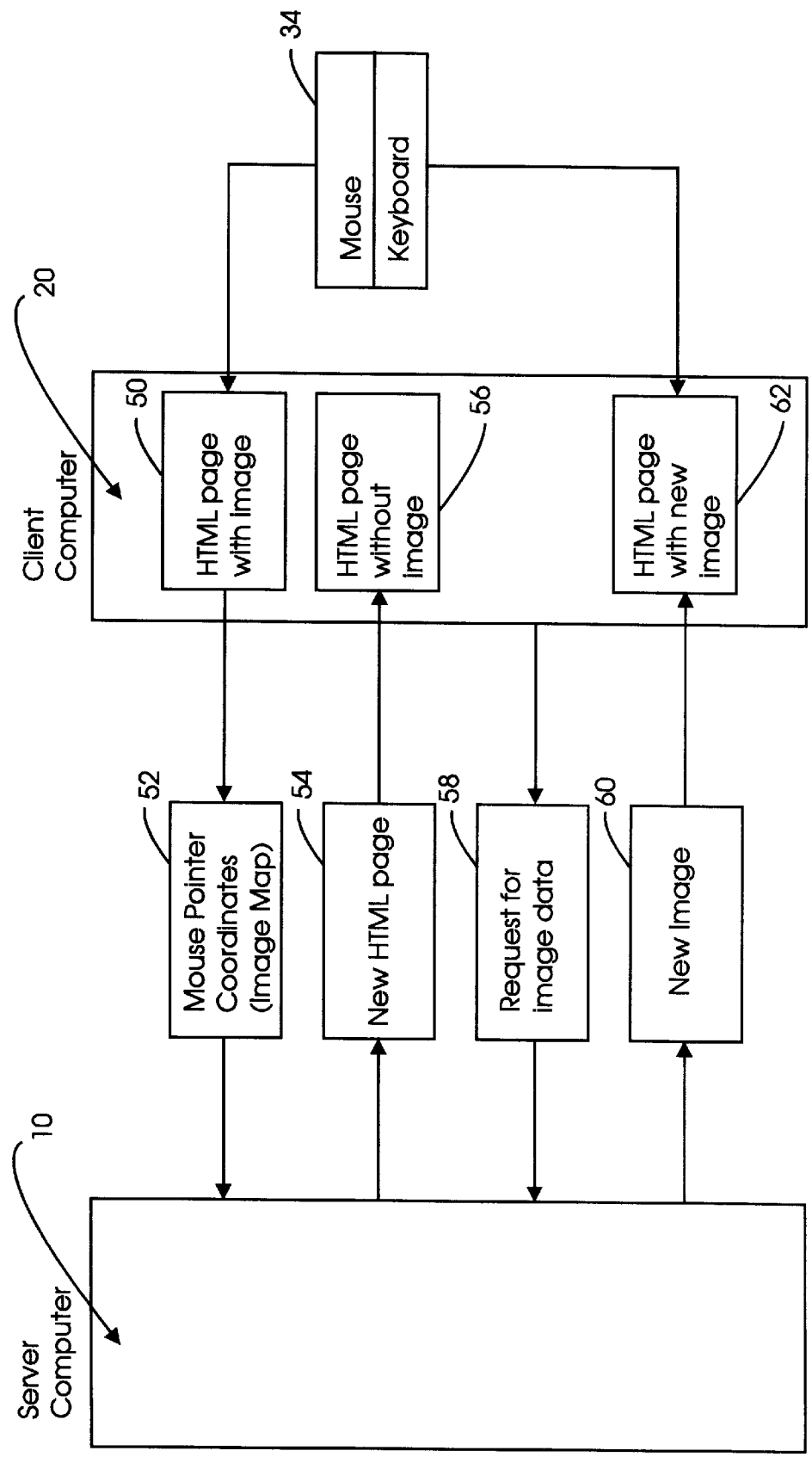
FIG. 3 is a simplified flow chart indicating the operation of a preferred embodiment of the present invention in response to a single user command.

FIG. 3 illustrates a simplified flow chart for one step in a preferred embodiment of the present invention. After an initial request is made, an HTML page 50 is displayed on a client computer 20. The HTML page contains within it a view window, such as that illustrated in FIG. 2 and described hereinabove, within which an embedded image portion is displayed. Using a mouse or keyboard 34 for positioning, the user clicks on the mouse at a position within the view window. HTML identifies the image portion being viewed as an image map, and the client sends the mouse pointer coordinates 52 to the server computer 10. The server computer 10 calculates the sub-region within which the mouse coordinates are situated, and dynamically creates a new HTML page 54, with a link to an embedded image, constituting the response to the user mouse click. Examples of such an HTML page appear in Appendix A, and a listing of the software system which generated them appears in Appendix B.

The client computer first receives the HTML page 56, without having the data for rendering the embedded image. In a preferred embodiment of the present invention, the HTML page 56 identifies the image portion to be embedded as a URL with a sequence of IIP commands. The IIP command sequence contains a reference to the FLASH-PIX® image file, a specification of the region of the FLASH-PIX® image to be displayed, information about the pixel dimensions of the view window, and a CVT command.

The browser encounters the IIP command sequence and sends an IIP request for image data 58 to the server. The server parses the request, accesses the necessary FLASH-PIX® image tiles, assembles them into a rectangular image portion 60, and sends the new image back to the client. In turn, the client then displays the HTML page with the new image portion embedded within it.

Appendix A contains examples of three HTML pages, corresponding to an initial view of an image and two successive zoom-ins. Appendix B contains a listing of the software which was used to generate these pages.

It is apparent to those skilled in the art that the image portion being displayed can also be viewed without the HTML page, as a stand alone image.

Figure 4:
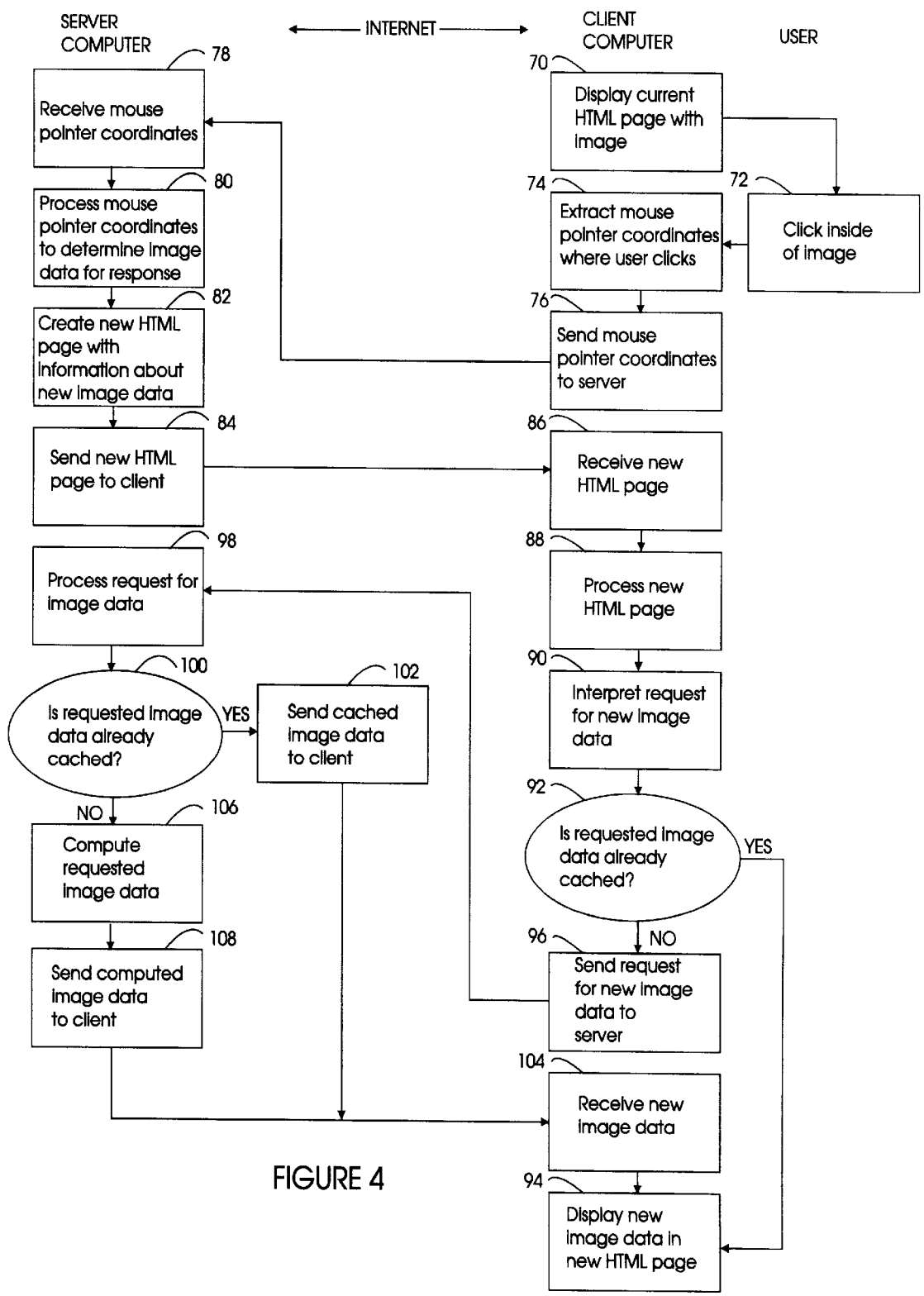
FIG. 4 is a simplified flowchart of the operation of the embodiment of FIG. 3.

Referring to FIG. 4, there is illustrated a simplified flowchart of a preferred embodiment of the present invention. When the browser first accesses an HTML page on the server, the page is sent to the client with an initial layout. The initial HTML page can be either static or dynamic. At step 70 the current HTML page is displayed with an image portion embedded therewithin. At step 72 the user viewing the page clicks on a location within the view window that contains the embedded image portion. The browser extracts the mouse pointer coordinates where the user clicked at step 74, and sends them to the server at step 76.

At step 78 the server receives the mouse pointer coordinates, and at step 80 the server calculates which sub-region contains these coordinates. It then identifies the image portion to be used for the response, based on the sub-region calculated. At step 82 the server dynamically creates a new HTML page with a link to indicate the response image portion. In a preferred embodiment of the present invention, the link is an IIP command sequence. Examples of such an HTML page are provided in Appendix A, and Appendix B contains a listing of the software which was used to generate them. At step 84 the server sends the newly created HTML page back to the client.

At step 86 the client receives the new HTML page, and at step 88 the browser processes the page. At step 90 the browser recognizes that the HTML page contains a link to an embedded image portion. At step 92 the client checks whether that embedded image portion is already resident in its local cache. If so, then the page can be displayed at once at step 94, with the embedded image rendered. Otherwise, at step 96 the client sends the request for the image portion back to the server. Internet browsers support caching, so it is not necessary to use special client software for this.

At step 98 the server processes the request for the image portion. In a preferred embodiment of the present invention, this entails parsing the IIP command sequence, to translate the IIP syntax into specific instructions. At step 100 the server checks whether the requested image portion is already resident in its local cache. If so, it immediately sends the cached image data to the client, at step 102, and the client receives the data at step 104. Otherwise, at step 106 the server produces the requested image data. In a preferred embodiment of the present invention, this entails accessing the appropriate tiles from the specified FLASHPIX® image file, and assembling them together. At step 108 the server sends the computed image data to the client.

The client receives the image data at step 104 and displays the HTML page with the embedded image rendered at step 94. At this point, the step of going from one displayed HTML page to another, in response to an interactive user request, is complete, and the step can be repeated.

The present invention also teaches operation of interactive user commands without use of image maps as is described hereinbelow.

Figure 5:
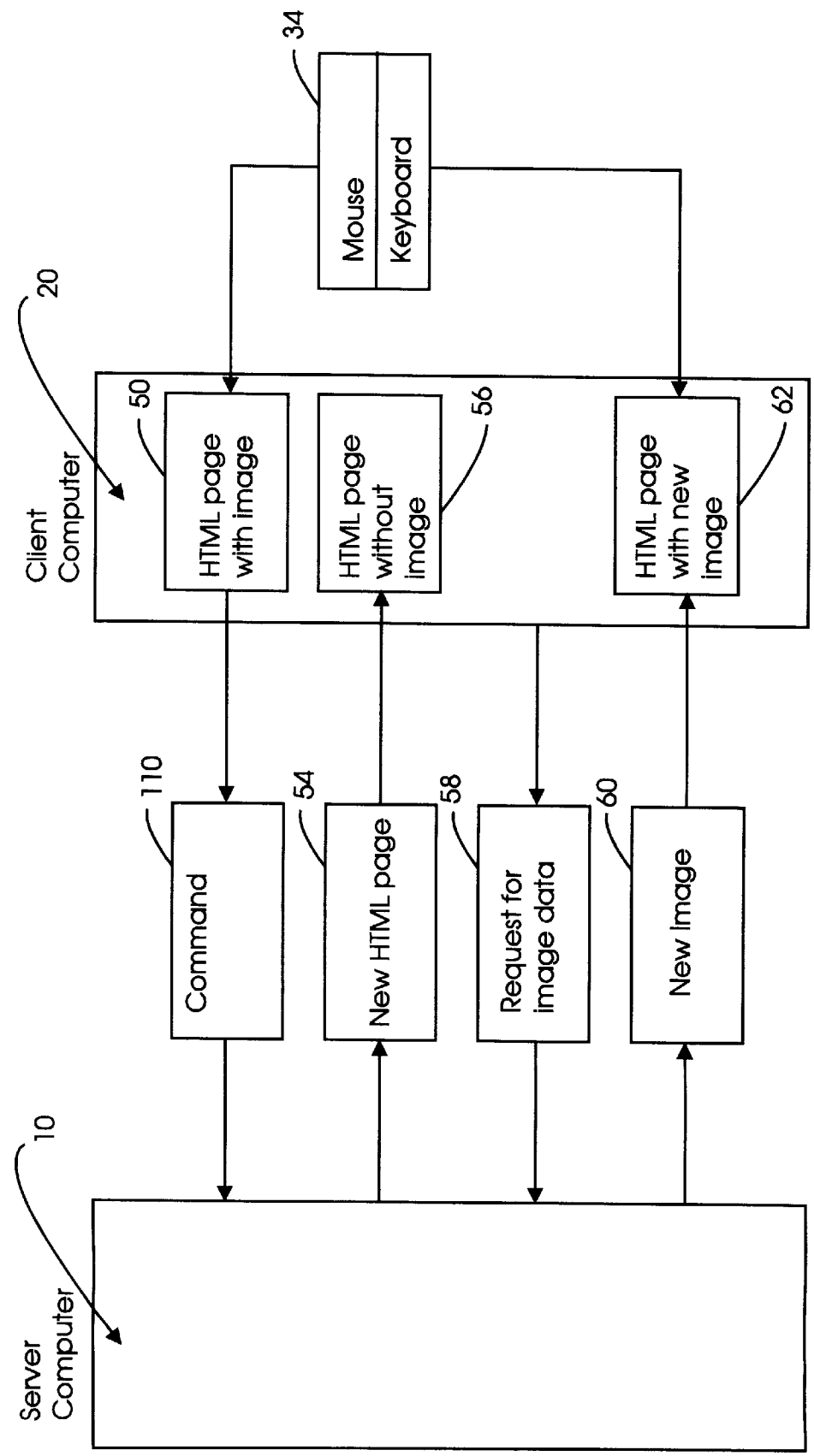
FIG. 5 is a simplified flow chart indicating the operation of a preferred embodiment of the present invention in response to a single user command.

Reference is now made to FIG. 5 which illustrates a simplified flow chart for one step in a preferred embodiment of the present invention. FIG. 5 is identical with FIG. 3, with the exception of the element indicated by numeral 110. Whereas in FIG. 3 mouse pointer coordinates are transmitted from a client to a server, in FIG. 5 a command is transmitted.

Figure 6:
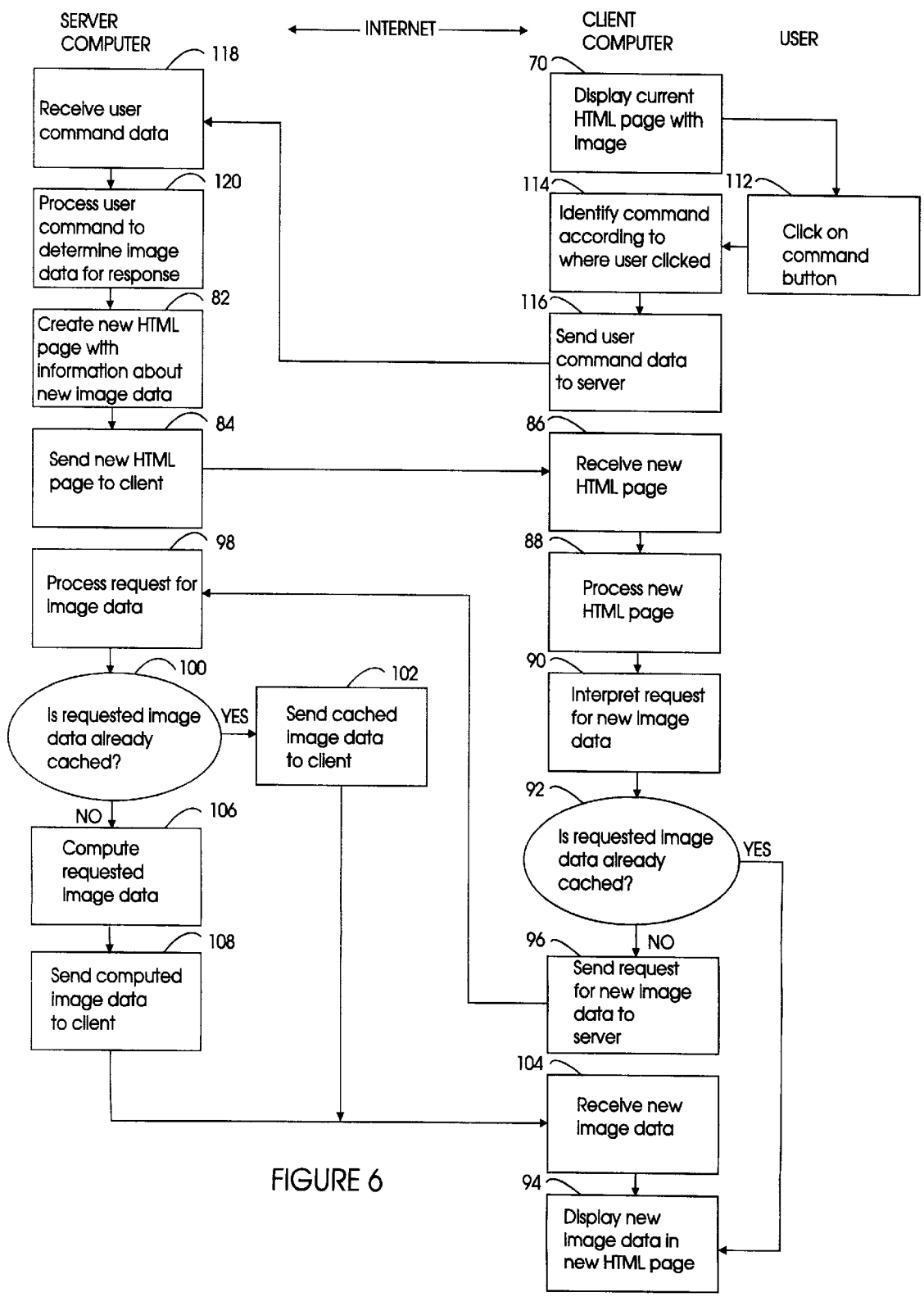
FIG. 6 is a simplified flowchart of the operation of the embodiment of FIG. 5.

Reference is also made to FIG. 6 which illustrates a simplified flowchart of a preferred embodiment of the present invention. FIG. 6 is identical with FIG. 4, with the exception of the steps indicated by numerals 112, 114, 116, 118 and 120. At step 112 a user clicks on one of several buttons, each corresponding to a specific interactive command. Examples of such commands are (1) centered zoom-in, (2) centered zoom-out, (3) pan in one of several directions, (4) reset to initial image view and (5) print. At step 114 the browser identifies the area where the user clicked, thereby identifying the button and the desired associated user command. At step 116 the client sends the command data to the server in the form of an HTTP request. At step 118 the server receives the user command data embedded within the HTTP request, and extracts it. At step 120 the server processes the user command so as to determine the appropriate image data to be displayed in response to the command.

Information such as mouse pointer coordinates or a selected user command is preferably sent from a client to a server by means of an HTTP request. The HTML language offers a mechanism to link an HTTP request with an object. Specifically, an HTML instruction
<A HREF='hello.html'>Hello </A>
links a URL for an HTML page hello.html with text reading "Hello." A browser will display text reading "Hello" with a link, so that when a user clicks on the text, the browser dispatches an HTTP request to the server for the HTML page hello.html.

Similarly, an HTML instruction
<A HREF='hello.html'><IMAGE SRC='photo.gif'></A>
links a URL for an HTML page hello.html with a GIF image photo.gif. A browser will request the photo.gif image data from the server by means of an HTTP request and, upon receiving the data, display the photo.gif image with a link, so that when a user clicks on the displayed image, the browser dispatches an HTTP request to the server for the HTML page hello.html.

The GIF image in this example can be replaced with a JPEG image, or even with an IIP request for a JPEG image. For example, an HTML instruction
<A HREF='hello.html'><IMAGE
SRC='fif=photo.fpx&obj=iip,1.0&wid=300&hei=300&cvt=jpeg'></A>
links a URL for an HTML page hello.html with a JPEG image that originates from an IIP request for a 300×300 pixel image from photo.fpx in the JPEG format. Again, a browser will dispatch the above IIP request within an HTTP request to the server and, upon receiving the JPEG image data, display the JPEG image with a link, so that when a user clicks on the displayed image, the browser dispatches an HTTP request to the server for the HTML page hello.html.

The URL within an HTML instruction can be any data that the server should understand. For example, an HTML instruction
<AHREF='http://123.456.789.01:8000/photo.fpx,300,300'><IMAGE SRC='photo.gif'></A>
links to photo.gif a URL for an HTTP request to IP address 123.456.789.01 and port 8000 with the text string "photo.fpx, 300, 300." As long as the server knows how to interpret this text string, it can process the HTTP request.

In a preferred embodiment, the present invention operates through HTML instructions of the form
<A HREF='<%NEXT_URL%>'><IMAGE SRC= '<%IMAGE%>'
ISMAP></A>
or of the form
<A HREF='<%NEXT_URL%>?COMMAND'><IMAGE SRC='<%IMAGE%>'></A>
The server replaces the field %NEXT_URL% with data for the appropriate URL and it replaces the field %IMAGE% with an IIP request for an image, or with a GIF image, as applicable. These fields are dynamically updated within an HTML page as the user interacts with the image. The COMMAND refers to one of several interactive user commands, such as ZOOM_IN, ZOOM_OUT, PAN and RESET.

When using image maps, the browser automatically appends a string '?x,y' to the HTTP request, where x and y are the mouse coordinates. The ? symbol serves to delineate the image map parameters from the rest of the HTTP request. When using commands, rather than image maps, a preferred embodiment of the present invention appends a string '?COMMAND' to the HTTP request. The server knows whether the data following the ? symbol is image map or command data, since the former has two data tokens and the latter has only one data token.

In a preferred embodiment of the present invention, the %IMAGE% field is a GIF button image when used in conjunction with commands, and the displayed JPEG image when used in conjunction with image maps. That is, in a preferred embodiment, the browser displays the JPEG image within a display window, underneath of which are several command buttons. When clicking on the JPEG image, the linked HTTP URL contains image map data, and when clicking on the command buttons, the linked HTTP URL contains command data. It is apparent to one skilled in the art that many variations of linking display objects with HTTP URLs are possible.

This mechanism is a key feature of the present invention. It enables a server to provide response image data, in response to a user clicking within an image being displayed or clicking on a command button, entirely by means of HTML pages and without the use of client software other than the Internet browser itself. In particular, a user connected to a web site employing server software operative in accordance with the present invention can automatically interact with images on the site without the need to download client plug-in software or a client Java applet.

In a preferred embodiment of the present invention, panning is carried out by means of two HTML pages. The first page is in zoom mode, and contains a pan command button, whereby the user can select to be in pan mode. The server responds by sending a second HTML page which is in pan mode, whereby the image is partitioned into nine imaginary regions, corresponding to division of the width and height into equal thirds, as illustrated in FIG. 7. The names "zoom mode" and "pan mode" correspond to the functionality provided when clicking somewhere within the displayed image. In zoom mode, clicking within the image itself effects a zoom-in, whereas in pan mode clicking within the image itself near the boundary of the image effects a directional pan, preferably in one of eight directions (N, NE, E, SE, S, SW, W, NW).

Referring to FIG. 7, clicking somewhere within the middle left third of the image initiates a pan W command, resulting in translation, or pulling, of the image leftward by a distance in pixels equal to half of the display width. Clicking somewhere within the middle bottom third initiates a pan S command, resulting in translation of the image downward by a distance in pixels equal to half of the display height. Clicking somewhere within the middle of the bottom left third initiates a pan SW command, resulting in translation of the image leftward by a distance in pixels equal to half of the display width, and also downward by a distance in pixels equal to half of the display height. Clicking somewhere within any of the other regions not in the very middle of the image has a similar pan effect. Clicking in the middle region has an effect of zoom-in.

It is apparent to one skilled in the art that the panning distance is not required to be equal to half of the display width for horizontal panning or half of the display height for vertical panning. Rather, it can be arbitrarily set.

Illustrated in FIG. 7 is a current image 122 being displayed. The image is partitioned into the nine regions described hereinabove. A user clicks at location 124 in the region labeled NW, in order to pan the image in the northwest direction. The result of the pan is to display a new image portion 126, extending from the center of image 122 rightward and downward. Note the inverted correspondence, whereby an upward pan corresponds to display of an image portion below the currently displayed portion, and that a leftward pan corresponds to display of an image portion to the right of the currently displayed portion. This is because the view window remains fixed when the image is translated, or pulled.

Current HTML-driven client applications, such as New Mexico Software's IMAGE ASSETS server, customize each response to the exact user navigation command. For example, when zooming in, they respond with a magnified image portion which is exactly centered at the location of the mouse pointer. As a result, there is significantly less re-use of the same image portions, since the user rarely navigates back to exactly the same configuration, and the advantage offered by caching is almost entirely eliminated. In turn, the server must carry out the processing of each image portion, as in step 106 of FIGS. 4 and 6, which drains the server and slows down its response time.

A unique feature of the present invention, that makes it practical, is the quantization of the user navigation responses. Thus it will be appreciated that the present invention is enabling for technologies which desire to avoid using client software other than the browser and rely instead on dynamic HTML.

Appendix A lists source files for three dynamically created HTML pages, and a fourth template HTML page. A first HTML page contains an initial view of an image photo.fpx. The image is obtained by means of an IIP request
fif=photo.fpx&obj=iip,1.0&wid=300&hei=300&rgn=0,0,0.0,1.0,1.0&cvt=jpeg Specifically, this IIP request is for data from a FlashPix image file photo.fpx using version 1.0 of the IIP protocol. The desired image data corresponds to a 300×300 pixel resolution image of the entire region of the FlashPix image, in the JPEG format. Note the use of port 8087 with the IIP request. Port 8087 is the server port that handles IIP requests.

When the user clicks on this image, an HTTP request is dispatched to IP address 123.456.789.01 and port 8081. Port 8081 is the server port that handles incoming data. The data sent is a string
1,photo.fpx,0.0,0.0,1.0,1.0,300,300,0.0,0.0,1.0,1.0,1.0

The server knows to interpret this string as follows: The first data item, 1, is an HTML page number. The second data item, photo.fpx, is the name of a FlashPix image file. The third data item, 0.0,0.0,1.0,1.0 is the current region of the FlashPix image being displayed. Regions are specified as relative coordinates $x_1, y_1, x_2, y_2$ where $(x_1, y_1)$ are the coordinates of the lower left corner of the region, and $(x_2, Y_2)$ are the coordinates of the upper right corner of the region. The coordinates are based on a relative scale from 0 to 1, where 1 corresponds to the full width or height. The fourth data item, 300,300 are the dimensions of the display window, and the fifth data item, 0.0,0.0,1.0,1.0 is the region displayed initially. This initial region is used whenever the user issues a reset command, as indicated in the software listing in Appendix B.

The image displayed is designated as an image map (ISMAP). When a user clicks somewhere within the displayed image, the browser appends a ?x,y to the URL within the HTTP request. Thus the actual URL sent from the client to the server in response to a user click within the image is
1,photo.fpx,0.0,0.0,1.0,1.0,300,300,0.0,0.0,1.0,1.0,1.0?x,y
containing a sixth data item, ?x,y, where (x, y) are the mouse pointer coordinates. The server knows how to interpret this and extract the x, y coordinates, in order to update the region for the image to be displayed in response to the user click.

A second HTML page corresponds to the page in response to a user having clicked somewhere within the middle region of the displayed image photo.fpx. This triggers a centered zoom-in. This is indicated in the second HTML page by the region
rgn=0.25,0.25,0.5,0.5
within the IIP request. It may be observed that the IIP syntax defines a region in terms of relative parameters x,y,w,h where (x, y) are the coordinates of the lower left corner of the region, w is the region width and h is the region height. Thus 0.25,0.25,0.5,0.5 designates the middle region, extending from lower left coordinates (0.25, 0.25) to upper right coordinates (0.75, 0.75). Displaying this middle region as a 300×300 pixel image, gives the effect of the desired zoom-in.

A third HTML page corresponds to a pan mode user interface with buttons underneath the displayed image. This page is numbered 2, in order to distinguish it from the zoom mode page numbered 1. There are buttons for zoom-in, zoom-out, pan, reset, print and info. The zoom-out button, for example, is displayed by means of a GIF image zoomout.gif, located in a directory named images. Preferably zoomout.gif is a small image of a magnifying glass with a + sign in the middle. When a user clicks on this button, an HTTP request is dispatched to server port 8081 with the data string
1,photo.fpx,0.0,0.0,1.0,1.0,300,300,0.0,0.0,1.0,1.0,1.0?ZOOM_OUT The server knows how to interpret this and extract the ZOOM_OUT command, so that it can modify the region of the image to be displayed in response to the user click.

The displayed image is partitioned according to a map named "pan." The data in Appendix A corresponds to the partition illustrated in FIG. 7 described hereinabove.

A fourth HTML page is a template page, with fields that are set by the server when it processes a client request. It will be observed that the template contains fields <%NEXT_URL%>, <%WIDTH%>, <%HEIGHT%>, <%IMAGE%>, <%URL%>, <%FILE%>and <%STATE%>. The NEXT_URL tag contains the string of data to be included in an HTTP request, with the exception of the ? symbol and the data appended thereafter. The NEXT_URL tag can be sub-divided into three tags URL, FILE and STATE, where URL contains the IP address and port data, FILE contains the FlashPix image file name and STATE contains the region and dimension data. The WIDTH and HEIGHT tags contain the display dimensions. The IMAGE tag contains the IIP request for the displayed image portion.

The server dynamically updates the appropriate data for each of the above tags, in response to an incoming HTTP request, and uses the tags to create an updated HTML page.

Appendix B is a listing of a Java servlet which can be used to generate dynamic HTML pages, like those in Appendix A. The method
Request(HttpRequest req, HttpResponse res, HtpRequestThread i_httpRequestThread)
processes an incoming HTTP request req and produces an HTTP response res. It does so by stripping out the URL from req by means of the method req.get (Http.QUERY), and calling GenerateResponse( ) to store the response in a byte array byteArrayOutputStream.

The method
GenerateResponse(ByteArrayOutputStream out, String request)
parses the string request, extracting region data into a rectangle oldRect, dimension data into a dimension dim, and region data into a rectangle initRect. Then it counts the number of remaining data tokens. If two tokens remain, then the server identifies them as image map coordinates, and invokes a method ZoomIn ( ) to calculate the new rectangle newRect.

If one token remains, then the server identifies it as a user command. For a ZOOM_IN command, the server invokes the method ZoomIn( ), with parameters 0.5,0.5 indicating a centered zoom, to calculate a new rectangle newRect. For a ZOOM_OUT command, the server invokes a method ZoomOut( ) to calculate a new rectangle newRect. For a RESET command, the server simply sets newRect to InitRect. For a PAN command, the server extracts the pan direction from a hash table, and invokes the method Pan( ) to calculate a new rectangle newRect. Finally, after newRect is determined, a method MakeNewRequest( ) is invoked to update the various HTML tags described hereinabove.

The methods ZoomIn( ), ZoomOut( ) and Pan( ) are mathematical routines that carry out the necessary arithmetic to derive a new region from an old region in correspondence with the selected command. The details of this arithmetic are evident in the listing from Appendix B. For clarification, a description of one of these three routines, ZoomIn( ), is provided hereinbelow, since the other two routines are similar.

ZoomIn( ) takes as input parameters relative coordinates i_x and i_y within the view window. These coordinates are floating point numerals ranging between 0 and 1. For a centered zoom-in, they would each be equal to 0.5. ZoomIn( ) identifies the quarter-integer of the form k/4 that is nearest to i_x, where k is one of the integers 0, 1, 2, 3 or 4. Similarly, ZoomIn( ) identifies the quarter integer of the form l/4 that is nearest to i_y, where l is one of the integers 0, 1, 2, 3, or 4. The desired rectangular zoom-in region is the one centered at (k/4, l/4) with a width and height of ½ in relative scale, relative to the view window. Translating this into absolute coordinates, if $(x_1, Y_1)$ denotes the lower left coordinate of the old rectangular region, and if w and h denote the width and height, respectively, of the old rectangular region, then the desired rectangular zoom-in region is centered at $(x_1+k*w/4, Y_1+l*h/4)$ and has width w/2 and height l/2 .

When k and 1 are each either 1, 2 or 3, then (k/4, l/4) is an interior point, and the rectangular zoom-in region described hereinabove is guaranteed to lie within the boundaries of the full image. However, if k or l takes a value of 0 or 4, then it is possible that the rectangular zoom-in region may extend beyond the boundaries of the full image. ZoomIn( ) checks for this, and if necessary it shifts the above calculated rectangular zoom-in region horizontally and/or vertically by w/4 and/or l/4, respectively, in order to keep it within the confines of the full image.

The resulting zoom-in region is thus a sub-region of the old rectangular region. When this zoom-in region is displayed at the same pixel resolution as the old region, it gives the user the desired effect of having zoomed-in, or magnified, by a factor of two, a selected part of the image previously displayed. It is apparent to one skilled in the art that the zoom-in factor is not required to be two, and can be set arbitrarily.

The method MakeNewRequest( ) sets the various HTML tags by means of a hash table and invokes a method PerformMerge( ) (listing not included) to embed the tags into an HTML page, thereby producing the desired byte array result.

It will be appreciated by persons skilled in the art that the present invention is very broad, and has many extensions beyond those scenarios described hereinabove. It is apparent that the present invention is not limited to still images and panoramas, but applies to other types of multimedia as well. For example, it applies to object movies and slide shows, whereby the response to a user request made while viewing a current frame of the movie or slide show, is to display a different frame.

It is also apparent that the use of sub-regions in the present invention can be complemented by or replaced with user interface buttons, so that clicking on a specific button corresponds to selecting a specific subregion.

It is also apparent that the present invention applies to digital image data stored within a single file, or distributed among multiple files.

It will be appreciated by persons skilled in the art that the present invention is not limited by what has been particularly shown and described hereinabove. Rather the present invention includes combinations and sub-combinations of the various features described hereinabove as well as modifications and extensions thereof which would occur to a person skilled in the art and which do not fall within the prior art.

What is claimed is:

1. A method for archiving digital data on a server computer, and enabling a user, by means of a client computer, to interactively view a digital image derived from said digital data, comprising:

receiving by said client computer from said server computer an HTML page, said HTML page including a view window within which a first image is displayed, the first image being a first portion of the digital image;

selecting by said user, using a pointing device, a command;

sending by said client computer to said server computer an indication of the command selected by said user;

in response to said sending an indication of the selected command, dynamically constructing a second image, the second image being a second portion of the digital image, and the second portion of the digital image corresponding to the selected command;

modifying by said server computer, using server-side software, the HTML page to generate a new HTML page, the new HTML page having a link to the second image; and sending by said server computer to said client computer said new HTML page.

2. A method according to claim 1 and wherein said sending by said client computer to said computer also includes sending client state information to said server computer.

3. A method according to claim 2 and wherein said client state information includes the size and location of said view window.

4. A method according to claim 2 and wherein said client state information includes an indication of the region within said digital image occupied by said first image.

5. A method according to claim 2 and wherein said client state information includes an indication of the region within said digital image initially occupied by said first image.

6. A method according to claim 1 and wherein said link to the second image is a sequence of commands forming part of the Internet Imaging Protocol (IIP).

7. A method according to claim 6 and wherein said sequence of commands forming part of the IIP includes a convert (CVT) command.

8. A method according to claim 1 and wherein said digital data is a tiled multi-resolution image file.

9. A method according to claim 1 and wherein said second image is built from tiles within a multi-resolution image file.

10. A method for interactive viewing of a digital image by a user, said viewing being controlled by a client computer, the method employing digital data residing on a server computer and comprising:

receiving by said client computer from said server computer a first HTML page, said first HTML page including a view window within which a first image is displayed, the first image being a first portion of the digital image;

selecting by said user, using a pointing device, a command;

receiving by said client computer a second HTML page, generated by said server computer, in response to said command which was selected, wherein said second HTML page contains a link to a dynamically constructed second image, the second image being a second portion of the digital image, and the second portion of the digital image corresponding to the selected command; and repeating said selecting and said receiving of said second HTML page at least once, with the second HTML page being used in place of the first HTML page in each successive repetition.

11. A method according to claim 10 and wherein said digital data is a tiled multi-resolution image file.

12. A method according to claim 10 and wherein said link to the second image is a sequence of commands forming part of the Internet Imaging Protocol (IIP).

13. A method according to claim 12 and wherein said sequence of commands forming part of the IIP includes a convert (CVT) command.

14. A method according to claim 10 and wherein said second image is built from tiles within a multi-resolution image file.

15. A method for generating dynamic HTML pages on a server computer, to enable a user to interactively view a digital image on a client computer, by interactive selection of a command by said user, comprising:

receiving from said client computer an indication of a user selected command;

in response to said receiving an indication of the user selected command, dynamically constructing an image, the image being a portion of the digital image, and the portion of the digital image corresponding to the user selected command;

creating an HTML page containing a link to the image; and sending said HTML page to said client computer.

16. A method according to claim 15 and wherein said receiving also includes receiving client state information.

17. A method according to claim 15 and wherein said link to an image is a sequence of commands forming part of the Internet Imaging Protocol (IIP).

18. A method according to claim 17 and wherein said sequence of commands forming part of the IIP includes a convert (CVT) command.

19. A method according to claim 15 and wherein said digital image is a tiled multi-resolution image.

20. A method according to claim 15 and wherein said image is built from tiles within a multi-resolution image file.

21. An archival system for archiving digital data on a server computer, and enabling a user, by means of a client computer, to interactively view a digital image derived from said digital data, comprising:

a first communication channel for receiving by said client computer from said server computer an HTML page, said HTML page including a view window within which a first image is displayed, the first image being a first portion of the digital image, and for subsequently sending by said server computer to said client computer a new HTML page;

a pointing device for selecting by said user a command;

a second communication channel for sending by said client computer to said server computer an indication of the command selected by said user; and at least one processor for dynamically constructing a second image, the second image being a second portion of the digital image, and the second portion of the digital image corresponding to the selected command, and for modifying the HTML page to generate said new HTML page, the new HTML page having a link to the second image.

22. A system according to claim 21 and wherein said second communication channel is also used to send client state information to said server computer.

23. A system according to claim 22 and wherein said client state information includes the size and location of said view window.

24. A system according to claim 22 and wherein said client state information includes an indication of the region within said digital image occupied by said first image.

25. A system according to claim 22 and wherein said client state information includes an indication of the region within said digital image initially occupied by said first image.

26. A system according to claim 21 and wherein said link to a second image is a sequence of commands forming part of the Internet Imaging Protocol (IIP).

27. A system according to claim 26 and wherein said sequence of commands forming part of the IIP includes a convert (CVT) command.

28. A system according to claim 21 and wherein said digital data is a tiled multi-resolution image file.

29. A system according to claim 21 and wherein said second image is a tiled multi-resolution image file.

30. A client viewing system for interactive viewing of a digital image by a user, said viewing being controlled by a client computer, employing digital data residing on a server computer, comprising:

a communication channel for receiving by said client computer from said server computer a first HTML page, said first HTML page containing a view window within which a first image is displayed, the first image being a portion of the digital image;

a pointing device for repeatedly selecting by said user a command; and a communication channel for repeatedly receiving by said client computer a second HTML page, generated by said server computer, in response to a selected command, wherein said second HTML page contains a link to a dynamically constructed second image, the second image being a second portion of the digital image, and the second portion of the digital image corresponding to said selected command, and wherein the second HTML page is used in place of the first HTML page when the pointing device is next used to select a command.

31. A system according to claim 30 and wherein said digital data is a tiled multi-resolution image file.

32. A system according to claim 30 and wherein said link to the second image is a sequence of commands forming part of the Internet Imaging Protocol (IIP).

33. A system according to claim 32 and wherein said sequence of commands forming part of the IIP includes a convert (CVT) command.

34. A system according to claim 30 and wherein said second image is built from tiles within a multi-resolution image file.

35. A server dynamic HTML system for generating dynamic HTML pages on a server computer, to enable a user to interactively view a digital image on a client computer, by interactive selecting of commands by said user from among a plurality of commands, comprising:

a first communication channel for receiving from said client computer an indication of a user selected command;

at least one processor for dynamically constructing an image, the image being a portion of the digital image, and the portion of the digital image corresponding to said user selected command, and for creating an HTML page containing a link to the image; and a second communication channel for sending said HTML page to said client computer, said at least one processor being coupled to said first communication channel and to said second communication channel.

36. A system according to claim 35 and wherein said first communication channel is also used to receive client state information.

37. A system according to claim 35 and wherein said link to the image is a sequence of commands forming part of the Internet Imaging Protocol (IIP).

38. A system according to claim 37 and wherein said sequence of commands forming part of the IIP includes a convert (CVT) command.

39. A system according to claim 35 and wherein said digital image is a tiled multi-resolution image.

40. A system according to claim 35 and wherein said image is built from tiles within a multi-resolution image file.

41. A method for archiving digital data on a server computer and enabling a user to interactively view a digital image derived from said digital data, comprising:

receiving from said server computer a first layout containing a view window within which a first image is displayed, the first image being a first portion of the digital image;

selecting by said user, using a pointing device, a command;

in response to said selecting, dynamically constructing a second image, the second image being a second portion of the digital image, and the second portion of the digital image corresponding to the command selected by said user; and providing by said server computer to said user, using server-side software, a second layout, generated by said server computer by modifying the first layout, the second layout containing a reference to the second image.

42. A method according to claim 41 and wherein said digital data is a tiled multi-resolution image file.

43. A method according to claim 41 and wherein said reference to the second image is a reference to a multi-resolution image.

44. A system for archiving digital data on a server computer and enabling a user to interactively view a digital image derived from said digital data, comprising:

apparatus providing a first layout containing a view window within which a first image is displayed, the first image being a first portion of the digital image;

a pointing device for selecting by said user a command;

apparatus dynamically constructing a second image, the second image being a second portion of the digital image, and the second portion of the digital image corresponding to the command selected by said user; and apparatus providing a second layout, generated by said server computer, using serverside software, by modifying the first layout, the second layout containing a reference to the second image.

45. A system according to claim 44 and wherein said digital data is a tiled multi-resolution image file.

46. A system according to claim 44 and wherein said reference to the second image is a reference to a multi-resolution image.

* * * * *